UNITED STATES PATENT OFFICE.

GEORGE FREDERICK BLOMBERY, OF SYDNEY, NEW SOUTH WALES, AUSTRALIA.

MANUFACTURE OF AGGLUTINANT, SURFACE FINISHING AND SIZING COMPOSITION.

No Drawing.     Application filed February 13, 1922. Serial No. 536,354.

*To all whom it may concern:*

Be it known that I, GEORGE FREDERICK BLOMBERY, a subject of the King of Great Britain and Ireland, residing at Sydney, New South Wales, Australia, have invented certain new and useful Improvements in the Manufacture of Agglutinant, Surface Finishing and Sizing Composition, of which the following is a specification.

This invention consists in a composition usable as an agglutinant, and as a size or finish for surface of paper cards, building boards, and the like. It is compounded as follows:—

A thick creamy emulsion is prepared by agitating kaolin, calcium carbonate and common alum in water, and this emulsion is added to a solution of sodium silicate and intimately incorporated therewith. Heat is not applied. For calcium carbonate, magnesium carbonate may be substituted and formalin (60% formaldehyde) may be substituted for the alum or used in lieu of the alum. The sodium silicate should have a density of 38°–40° Baumé and the kaolin and the calcium carbonate (or magnesium carbonate) should be finely ground.

The respective proportions of the several ingredients used in practice are approximately as follows:—

|  | Per cent by weight. |
|---|---|
| Sodium silicate (38°–40° Bé) | 70 |
| Kaolin | 14 |
| Calcium carbonate (or magnesium carbonate) | 14 |
| Alum or formalin (both may be used) each | 2 |

The formalin used in the manufacture of the product is desirable as it is inimical to, or preventative of flocculation of the silicate, and operates to reduce or prevent liberation of alkaline substances, which may deleteriously effect paints, etc., while the alum reacts with the silicate to form a colloid. The product is a viscous liquid which remains liquid in a container but sets rapidly when applied to any more or less absorbent surface. It is applied cold upon paper cardboard, millboard, and like paper pulp products. It sets so rapidly that it is usable with marked success in the machine manufacture of cartons. When set it is waterproof and fire resisting, and it is not softened or released by soaking in water. It forms an effective substitute for glue in joinery work, and forms also an effective size or finish for wood, paper, ceramic or cementitious objects. It is almost colorless, and consequently does not injure the appearance of objects, as for instance paper or card cartons, on which it is used.

It is desirable to make up the composition in as stiff a consistency as is convenient for application. The relative proportions of the ingredients specified is stated approximately but not absolutely, as some marginal difference from these proportions is permissible.

What I claim as my invention and desire to secure by Letters Patent is:—

1. The herein described method of making a composition product usable for the purpose specified, consisting in incorporating a solution of sodium silicate (38–40° Bé. about) with an aqueous mixture of kaolin, calcium carbonate and formalin in the approximate proportions of 70:14:14 and 2 by weight respectively.

2. The herein described method of making a composition product usable for the purposes specified, consisting in incorporating a solution of sodium silicate (38–40° Bé. about) with an aqueous mixture of kaolin, calcium carbonate, common alum and formalin in the approximate proportions of 70:14:14:2 and 2 by weight respectively.

3. An adhesive composition consisting of the following ingredients in substantially the following proportions, sodium silicate (30–42° Bé. about) 70 weights, kaolin 14 weights, calcium carbonate 14 weights, formalin 2 weights incorporated in sufficient water to form a freely flowing viscous liquid.

4. An adhesive composition consisting of substantially the following proportions of sodium silicate (30–42° Bé. about) 70 weights, kaolin 14 weights, calcium carbonate 14 weights, common alum 2 weights and formalin 2 weights, incorporated in sufficient water to form a freely flowing viscous liquid.

In testimony whereof I affix my signature.

GEORGE FREDERICK BLOMBERY.